(12) United States Patent
Park et al.

(10) Patent No.: US 12,482,487 B2
(45) Date of Patent: Nov. 25, 2025

(54) MULTI-SCALE SPEAKER DIARIZATION FOR CONVERSATIONAL AI SYSTEMS AND APPLICATIONS

(71) Applicant: NVIDIA Corporation, Santa Clara, CA (US)

(72) Inventors: Taejin Park, Santa Jose, CA (US); Nithin Rao Koluguri, San Jose, CA (US); Jagadeesh Balam, Campbell, CA (US); Boris Ginsburg, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 374 days.

(21) Appl. No.: 17/979,989

(22) Filed: Nov. 3, 2022

(65) Prior Publication Data

US 2024/0153531 A1    May 9, 2024

(51) Int. Cl.
*G10L 25/87* (2013.01)
*G10L 25/30* (2013.01)

(52) U.S. Cl.
CPC .............. *G10L 25/87* (2013.01); *G10L 25/30* (2013.01)

(58) Field of Classification Search
None
See application file for complete search history.

(56) References Cited

U.S. PATENT DOCUMENTS

| | | |
|---|---|---|
| 11,158,307 B1 | 10/2021 | Ghias et al. |
| 11,900,947 B2 * | 2/2024 | Ghaemmaghami ..... G10L 17/04 |
| 12,100,383 B1 | 9/2024 | Ezzerg et al. |
| 2020/0058290 A1 | 2/2020 | Chae et al. |
| 2020/0302223 A1 | 9/2020 | Dutta et al. |
| 2020/0394997 A1 | 12/2020 | Trueba et al. |
| 2020/0402497 A1 | 12/2020 | Semenov et al. |
| 2021/0224319 A1 | 7/2021 | Ingel et al. |
| 2021/0304769 A1 | 9/2021 | Ye et al. |

(Continued)

FOREIGN PATENT DOCUMENTS

| | | | | |
|---|---|---|---|---|
| CN | 111696572 A | * | 9/2020 | ......... G10L 21/0272 |
| JP | 2015102667 A | * | 6/2015 | |
| WO | 2022063758 A1 | | 3/2022 | |

OTHER PUBLICATIONS

Park, Tae Jin et al. "Multi-Scale Speaker Diarization With Neural Affinity Score Fusion." IEEE, May 13, 2021, https://ieeexplore.ieee.org/stamp/stamp.jsp?tp=&arnumber=9414578. Accessed Dec. 6, 2024. (Year: 2021).*

(Continued)

*Primary Examiner* — Hai Phan
*Assistant Examiner* — Jon Christopher Meis
(74) *Attorney, Agent, or Firm* — Lowenstein Sandler LLP

(57) ABSTRACT

Disclosed are apparatuses, systems, and techniques that may use machine learning for implementing speaker diarization. The techniques include obtaining a speaker embedding for various reference times of a speech and for various differently-sized time intervals, identifying a plurality of clusters, each cluster associated with a different speaker of the speech. The techniques further include computing, using the speaker embeddings, a set of embedding weights for various differently-sized time intervals, and identifying, using the computed set of the embedding weights, one or more speakers speaking at a respective reference time.

20 Claims, 10 Drawing Sheets

(56) References Cited

U.S. PATENT DOCUMENTS

| | | | |
|---|---|---|---|
| 2022/0028367 A1 | 1/2022 | Shekhar et al. | |
| 2022/0051654 A1 | 2/2022 | Finkelstein et al. | |
| 2022/0093106 A1 | 3/2022 | Mosayyebpour Kaskari et al. | |
| 2022/0223144 A1 | 7/2022 | Sun et al. | |
| 2022/0319018 A1* | 10/2022 | Gervais | G06N 3/092 |
| 2023/0150498 A1* | 5/2023 | Seong | B60W 30/143 |
| | | | 701/93 |
| 2024/0037316 A1 | 2/2024 | Mohanty et al. | |
| 2024/0104055 A1 | 3/2024 | McAnallen | |
| 2024/0105289 A1 | 3/2024 | Khan et al. | |

OTHER PUBLICATIONS

Wang, Quan et al. "Speaker Diarization With LSTM." ArXiv, Jan. 23, 2022, https://arxiv.org/pdf/1710.10468. Accessed Dec. 6, 2024. (Year: 2022).*

Doty, Chris. "What Is Speaker Diarization?" Deepgram, Aug. 16, 2022, https://deepgram.com/learn/what-is-speaker-diarization. Accessed Dec. 6, 2024. (Year: 2022).*

Zhang, Yibin et al. "Audio segmentation based on multi-scale audio classification." IEEE, Aug. 30, 2004, https://ieeexplore.ieee.org/stamp/stamp.jsp?tp=&arnumber=1326835&tag=1. Accessed Dec. 6, 2024. (Year: 2004).*

Raj et al. "DOVER-Lap: A Method for Combining Overlap-aware Diarization Outputs." arXiv, Nov. 3, 2020, https://arxiv.org/abs/2011.01997. Accessed Jul. 10, 2025. (Year: 2020).*

Garcia-Romero, D. et al., "Speaker Diarization Using Deep Neural Network Embeddings", IEEE International Conference on Acoustics, Speech and Signal Processing (ICASSP), pp. 4930-4934, Mar. 5, 2017.

Han, W. et al., "ContextNet: Improving Convolutional Neural Networks for Automatic Speech Recognition with Global Context", arXiv preprint arXiv:2005.03191 (2020).

Kingma, D. et al., "Improved Variational Inference with Inverse Autoregressive Flow", 30th Conference on Neural Information Processing Systems, 9 pages, 2016.

Koluguri, N. et al., "Titanet: Neural Model for Speaker Representation With 1D Depth-Wise Separable Convolutions and Global Context", International Conference on Acoustics, Speech and Signal Processing, pp. 8102-8106, May 2022.

Lancucki, Adrian, "Fastpitch: Parallel Text-to-Speech with Pitch Prediction", In ICASSP 2021-2021 IEEE International Conference on Acoustics, Speech and Signal Processing (ICASSP), pp. 6588-6592. IEEE, 2021.

Muller, T. et al., "Neural Importance Sampling", ACM Transactions on Graphics (ToG), vol. 38, No. 5, 2019, pp. 1-19.

Park, T. et al., "Auto-Tuning Spectral Clustering for Speaker Diarization Using Normalized Maximum Eigengap", IEEE Signal Processing Letters, vol. 27, pp. 381-385, 2019.

Park, T. et al., "Multi-Scale Speaker Diarization with Neural Affinity Score Fusion", In ICASSP 2021-2021 IEEE International Conference on Acoustics, Speech and Signal Processing (ICASSP), pp. 7173-7177. IEEE, 2021.

Peng, K. et al., "Non-Autoagressive Neural Text-to-Speech", International Conference on Machine Learning, pp. 7586-7598, 2020.

Ren, Y. et al., "FastSpeech: Fast, Robust and Controllable Text to Speech", 33rd Conference on Neural Information Processing Systems (NeurIPS 2019), 13 pages.

Sasirekha, D. et al., "Text-to-Speech: A Simple Tutorial", International Journal of Soft Computing and Engineering, vol. 2, Issue 1, 4 pages, Mar. 2012.

Shih, K. et al., "Generative Modeling for Low Dimensional Speech Attributes with Neural Spline Flows", arXiv preprint arXiv:2203.01786 (2022).

Valle, R., "Flowtron: an Autoregressive Flow-based Generative Network for Text-to-Speech Sythesis", arXiv preprint arXiv:2005.05957. May 12, 2020.

Chen, J., et al., "VFlow: More Expressive Generative Flows with Variational Data Augmentation," Proceedings of the 37th International Conference on Machine Learning, PMLR, 2020, vol. 119, pp. 1660-1669. Retrived from the Internet: [https://proceedings.mlr.press/v119/chen20p.html].

Dumoulin, V., et al., "A Learned Representation For Artistic Style," Computer Vision and Pattern Recognition, ICLR, 2017, 26 Pages. Retrived from the Internet: [https://arxiv.org/abs/1610.07629].

Dupont, E., et al., "Augmented Neural ODEs," 33rd Conference on Neural Information Processing Systems, NeurIPS, 2019, vol. 32, pp. 3140-3150.

Durkan, C., et al., "Neural Spline Flows," Advances in Neural Information Processing Systems, 2019, vol. 32, pp. 7511-7522.

Huang, C.W., et al., "Augmented Normalizing Flows: Bridging the Gap Between Generative Flows and Latent Variable Models," Machine Learning, 2022, 27 Pages. Retrived from the Internet: [https://arxiv.org/abs/2002.07101].

Ito, K., et al., "The LJ Speech Dataset," BibSonomy, 2017. Retrived from the Internet: [https://keithito.com/LJ-Speech-Dataset/].

Jeong, M., et al., "Diff-TTS: A Denoising Diffusion Model for Text-to-Speech," Department of Electrical and Computer Engineering and INMC, 2021, 5 Pages. Retrived from the Internet: [https://arxiv.org/pdf/2104.01409.pdf].

Kawahara, H., et al., "Nearly Defect-free Fo Trajectory Extraction for Expressive Speech Modifications Based on Straight," In Ninth European Conference on Speech Communication and Technology, 2005, 5 Pages.

Kim, H., et al., "Softflow: Probabilistic Framework for Normalizing Flow on Manifolds," Advances in Neural Information Processing Systems, 2020, 10 Pages.

Kim, J., et al., "Glow-TTS: A Generative Flow for Text-to-speech via Monotonic Alignment Search," Advances in Neural Information Processing Systems, 2020b, 11 Pages.

Kingma, D.P., et al., "Glow: Generative flow with invertible 1×1 Convolutions," Advances in Neural Information Processing Systems, 2018, vol. 31, 10 Pages.

Kong, J., et al., "Hifi-gan: Generative Adversarial Networks for Efficient and High Fidelity Speech Synthesis," Advances in Neural Information Processing Systems, 2020, pp. 1-14.

Kong, J., et al., "Hifi-gan: Generative Adversarial Networks for Efficient and High Fidelity Speech Synthesis, "2022, Retrived from the Internet: [https://github. com/jik876/hifi-gan,].

Mauch, M., et al., "Pyin: A Fundamental Frequency Estimator Using Probabilistic Threshold Distributions," In 2014 IEEE International Conference on Acoustics, Speech and Signal Processing (Icassp), 2014, pp. 659-663.

Mccree, A.V., et al., "A Mixed Excitation Ipc Vocoder Model for Low Bit Rate Speech Coding," IEEE Transactions on Speech and Audio Processing, 1995, vol. 3(4), pp. 242-250.

Miao, C., et al., "Flow-TTS: A Non-autoregressive Network for Text to Speech Based on Flow," IEEE International Conference on Acoustics, Speech and Signal Processing (ICASSP), 2020, 5 Pages.

Moog, B., "MIDI: Musical Instrument Digital Interface," Journal of the Audio Engineering Society, 1986, vol. 34(5), pp. 394-404.

Nakatani, T., et al., "A Method for Fundamental Frequency Estimation and Voicing Decision: Application to Infant Utterances Recorded in Real Acoustical Environments," Speech Communication, Mar. 2008, vol. 50(3), pp. 203-214.

Ping,W., et al., "Waveflow: A Compact Flow-based Model for Raw Audio," In International Conference on Machine Learning, pp. 7706-7716.

Popov, V., et al., "Grad-TTS: A Diffusion Probabilistic Model for Text-to-Speech," Arxiv Preprint, 2021, 10 Pages.

Ren, Y., et al., "FastSpeech 2: Fast and High-Quality End-to-End Text to Speech," Aug. 8, 2022, 15 Pages. Retrived from the Internet: [https://speechresearch.github.io/fastspeech2/].

Ren, Y., et al., "FastSpeech 2: Fast and High-Quality End-to-End Text to Speech," arXiv:2006.04558v1 [eess.AS] Jun. 8, 2020.

Shih, K.J., et al., "RAD-TTS: Parallel Flowbased Tts With Robust Alignment Learning and Diverse Synthesis," In ICML Workshop on Invertible Neural Networks, Normalizing Flows, and Explicit Likelihood Models, 2021.

Suni, et al., Wavelets for Intonation Modeling in Hmm Speech Synthesis, ISCA, 2013, 7 Pages.

(56) References Cited

OTHER PUBLICATIONS

Valle, R., et al., "Flowtron: An Autoregressive Flow-based Generative Network for Text-to-speech Synthesis," In International Conference on Learning Representations, 2020b.

Valle, R., et al., "Mellotron: Multispeaker Expressive Voice Synthesis by Conditioning on Rhythm, Pitch and Global Style Tokens," In ICASSP 2020-2020 Ieee International Conference on Acoustics, Speech and Signal Processing, 2020a, pp. 6189-6193.

* cited by examiner

MULTI-SCALE SPEAKER DIARIZATION FOR CONVERSATIONAL AI SYSTEMS AND APPLICATIONS

TECHNICAL FIELD

At least one embodiment pertains to processing resources used to perform and facilitate speaker diarization. For example, at least one embodiment pertains to neural networks that allow for efficient automated association of speech utterances with corresponding speakers.

BACKGROUND

Speaker identification involves associating a spoken utterance with other utterances (or some representation of those utterances) stored in a database of speakers, and identifying a specific speaker who produced the spoken utterance and/or determining that the spoken utterance was produced by a speaker not represented in the database. Speaker diarization involves partitioning unstructured speech episodes involving multiple speakers (e.g., a conversation, a meeting, a public event, etc.) into time-stamped utterances produced by various specific speakers. Speaker diarization can be performed in conjunction with speaker identification, e.g., when the speakers participating in a speech episode are represented in the database of speakers, or independently from speaker identification, e.g., when one or more of the speakers cannot be recognized. Modern speaker identification and diarization systems often deploy trained neural network models.

DETAILED DESCRIPTION

Figure 1:
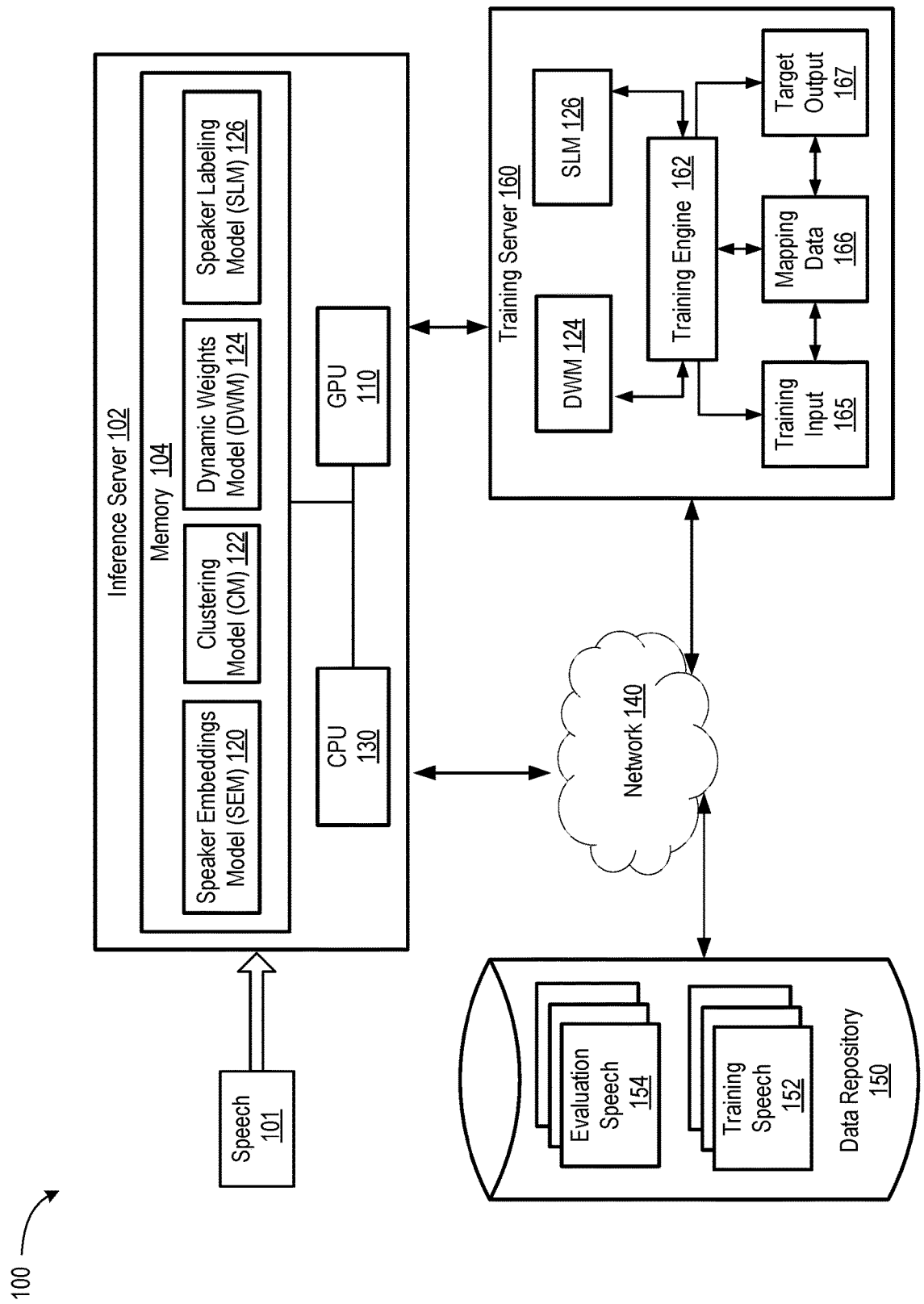
FIG. 1 is a block diagram of an example computer system capable of implementing a multi-scale machine-learning system with dynamically-weighted embeddings for efficient speaker diarization, according to at least one embodiment.

Deep neural network models may be trained to process speech utterances (or portions thereof) and to output speaker embeddings (e.g., in an embedding or latent space) that can be used as digital fingerprints to identify a speaker. A speaker embedding may be viewed as a vector in a special embeddings space. A well-designed and well-trained model generates embeddings for different utterances produced (spoken) by the same person that differ significantly less (in the embeddings or latent space) than utterances produced by different people. The models then group (cluster) the generated embeddings among a plurality of clusters corresponding to different speakers based on similarity (e.g., cosine similarity) of various embeddings. A number of different clusters (speakers) can be apriori unknown and itself be determined during embeddings clustering. Successful speaker diarization models often use a uniform segmentation approach, in which a speech utterance is partitioned into segments of a fixed duration, which can range from a fraction of a second to several seconds or longer. Existing diarization models, however, face a number of challenges. In particular, embeddings generated for short segments can be based on insufficient amounts of speech information, resulting in a low accuracy of segment-to-speaker attribution. Long segments, on the other hand, are more prone to errors due to capturing instances of multiple speakers speaking simultaneously and/or a segment straddling a boundary between utterances spoken by different people.

Aspects and embodiments of the present disclosure address these and other technological challenges by providing for techniques and systems that allow for accurate speech segment attribution with high temporal resolution of short speech segments and efficient detection of instances of overlapping speech by multiple speakers. The disclosed embodiments include generating embeddings, e.g., using a speaker embeddings model (SEM) for overlapping segments of multiple intervals or time scales (e.g., 0.5 sec (base scale), 1.0 sec, 1.5 sec., and so on), such that for any instance of time (reference time) $t_i$ there are embeddings $E_{i(k)}$ associated with various time scales, enumerated with index k. The spacing (shift window) between reference times, $t_{i+1}-t_i$, may be smaller than the smallest interval (base scale), e.g., may be 0.25 sec. Embeddings $E_{i(k)}$ associated with different reference times $t_i$ may be processed by a clustering model (CM). The CM performs initial clustering of the embeddings among a number of clusters, s=1, 2, . . . S, where S is a number of clusters (speakers) determined during initial clustering. As the number of speakers may vary with time, not all speakers S may be speaking at different reference times $t_i$. For example, any number (e.g., one, two, etc.) speakers may be speaking at time $t_1$ and any number of (the same or other) speakers may be speaking at reference time $t_2$. The CM may also output preliminary speaker labels for each reference time $t_i$. The CM may compute an aggregated (e.g., average) cluster embedding $V_{(k)}^s$ for each clusters and each time scale k, e.g., by averaging over $N_s$ embeddings $E_{i(k)}^s$ that are associated with (at all reference times) with the respective cluster (speaker) s: $V_{(k)}^s = N_s^{-1} \cdot \Sigma_{i=1}^{N_s} E_{i(k)}^s$.

Aggregated embeddings may represent initial digital fingerprints of various likely speakers in the speech episode. Using the embeddings, a context vector $C_i^s[k]$ may be formed for speakers and reference time $t_i$ (with components of the context vector corresponding to various time scales k) that characterize a similarity of speech pronounced within a certain (defined by the durations of the respective scales) temporal vicinity of reference time $t_i$ to the initial digital fingerprints of the likely speakers. In some embodiments, context vectors may represent weighted cosine similarity of the embeddings $E_{i(k)}$ and the aggregated cluster embeddings $V_{(k)}^s$: $C_i^s[k] = W_{i(k)} \cos(E_{i(k)}, V_{(k)}^s)$. The weights $W_{i(k)}$ may be computed by a dynamic weights model (DWM) separately for different reference times $t_i$. An input into the DWM may be the embeddings $E_{i(k)}$ stacked (e.g., concatenated) together with the set of aggregated cluster embeddings $\{V_{(k)}^s\}$ (including various clusters s=1 ... S and various time scales k), e.g., $D_i = (E_{i(1)} \ldots E_{i(K)}, \{V_{(k)}^s\})$, constructed separately for different reference times $t_i$. The stacked inputs $D_i$ may be processed by the DWM, which may apply one-dimensional (1D) convolutional filters, one or more convolutional layers, one or more linear layers, and/or a classifier (e.g., a softmax layer).

Context vectors $C_i^s[k]$ corresponding to various speakers s may then be combined, e.g., concatenated, $(C_i^1[k], C_i^2[k], \ldots)$, and processed by a speaker labeling model (SLM) that generates probabilities (or generalized likelihoods) $P_i^s$ that speaker s is speaking at reference time $t_i$. In some embodiments, the SLM may include one or more Long Short-Term Memory (LSTM) neuron layers/networks/subnetworks. In some embodiments, the SLM may operate on pairs of speakers (s, q) by processing context vectors corresponding to the respective pair of speakers, $(C_i^s[k], C_i^q[k])$, e.g., the SLM may be applied for a total of $S(S-1)/2$ times, one for each different pairing of S speakers. Individual instances of SLM processing may generate simulated pairwise probabilities $p_{i(s,q)}^s$ that speakers s and q are co-speaking at reference time $t_i$, as estimated from processing of the (s, q)-pair by the SLM. Simulated pairwise probabilities $p_{i(s,q)}^s$ may be output by two output channels (e.g., sigmoid classifiers) of the SLM corresponding to the respective speakers s and q. The probabilities $P_i s$ may then be computed by averaging all S-1 various pairwise probabilities $p_{i(s,q)}^s$ associated with a particular speaker s, e.g., $P_i^s = (S-1)^{-1} \cdot \Sigma_{q \neq s} p_{i(s,q)}^s$. In some embodiments, an empirical threshold value T may be used as a cut-off for probabilities $P_i^s$. A situation where $P_i^s < T$, for all speakers s indicates that the likelihood of two speakers co-speaking at reference times $t_i$ is low. In such instances, the output of the initial segmentation (by the CM) may be used instead of simulated probabilities $P_i^s$.

The advantages of the disclosed techniques include but are not limited to accurate high temporal resolution diarization of speech utterances capable of detecting instances where multiple speakers are speaking simultaneously. In particular, deployment of multiple temporal scales together with dynamical weights assigned to those scales, which are computed for a dense sequence of reference times, ensures that even short utterances are accurately attributed to correct speakers.

System Architecture

FIG. 1 is a block diagram of an example computer system 100 capable of implementing a multi-scale machine-learning system with dynamically-weighted embeddings for efficient speaker diarization, according to at least one embodiment. As depicted in FIG. 1, a computer system 100 may include an inference server 102, a data repository 150, and a training server 160 connected to a network 140. Network 140 may be a public network (e.g., the Internet), a private network (e.g., a local area network (LAN), or wide area network (WAN)), a wireless network, a personal area network (PAN), a combination thereof, and/or another network type.

Inference server 102 may include a desktop computer, a laptop computer, a smartphone, a tablet computer, a server, a wearable device, a VR/AR/MR headset or heads up display, a digital avatar or chat bot kiosk, an in-vehicle infotainment computing device, and/or any suitable computing device capable of performing the techniques described herein. Inference server 102 may be configured to receive speech 101 that may be associated with any speech episode involving multiple speakers. Speech episodes may include a public or private conversation, a business meeting, a public or a private presentation, an artistic event, a debate, an interaction between a digital agent (e.g., chat bot, digital avatar, etc.) and a user(s), an in-vehicle communication (e.g., between two or more occupants, between an occupant (s) and a chat bot, avatar, or digital assistant of the vehicle), and/or the like. Speech 101 may be recorded using one or more devices connected to inference server 102, retrieved from memory 104 of inference server 102, and/or received over any local or network connection (e.g., via network 140) from an external computing device. Speech 101 may be in any suitable format, e.g., WAV, AIFF, MP3, AAC, WMA, or any other compressed or uncompressed format. In some embodiments, speech 101 may be stored (e.g., together with other data, such as metadata) in data repository 150. Additionally, data repository 150 may store training speech 101 for training one or more models capable of speaker identification, speaker verification, and/or speaker diarization, according to some embodiments disclosed herein. Data repository 150 may be accessed by inference server 102 directly or (as shown in FIG. 1) via network 140.

Data repository 150 may include a persistent storage capable of storing audio files as well as metadata for the stored audio files. Data repository 150 may be hosted by one or more storage devices, such as main memory, magnetic or optical storage disks, tapes, or hard drives, network-attached storage (NAS), storage area network (SAN), and so forth. Although depicted as separate from inference server 102, in at least some embodiments, data repository 150 may be a part of inference server 102. In at least some embodiments, data repository 150 may be a network-attached file server, while in other embodiments data repository 150 may be some other type of persistent storage such as an object-oriented database, a relational database, and so forth, that may be hosted by a server machine(s) or one or more different machines coupled to the inference server 102 via network 140.

Inference server 102 may include a memory 104 (e.g., one or more memory devices or units) communicatively coupled with one or more processing devices, such as one or more graphics processing units (GPU) 110 and/or one or more central processing units (CPU) 130. Memory 104 may store one or more models, such as a speaker embeddings model (SEM) 120, a clustering model (CM) 122, a dynamic weights model (DWM) 124, and a speaker labeling model (SLM) 126 trained to process speech 101. Any or all of SEM 120, CM 122, DWM 124, and/or SLM 126 may be executed by GPU 110 and/or CPU 130. In some embodiments, SEM 120 may use speech 101 as an input, which may be training speech 152 or evaluation (inference) speech 154. Speech 101 may be segmented into intervals of a set of multiple durations (scales), $\tau_1, \tau_2 \ldots \tau_K$, and each interval may be processed by SEM 120 to generate a corresponding speaker embedding representative of the speech produced by one or more speakers during the respective interval.

The generated speaker embeddings may be grouped by CM 122 into clusters associated with different speakers. CM 122 may further identify preliminary speaker labels for various time intervals based on association of the embedding generated for the respective interval with one of the identified clusters. Speaker labels may be any ad hoc labels (e.g., numbers 1, 2 . . . S or any other suitable identifiers) that uniquely identify speakers in the speech episode (irrespective of whether these speakers have been previously encountered by SEM 120 and CM 122. CM 122 may further compute aggregated cluster embeddings (centroids) associated with each cluster as a whole. Aggregated cluster embeddings describe speech characteristics of each speaker averaged over temporal variations of that speaker's speech across the whole speech episode. Speaker embeddings generated by SEM 120 and grouped by CM 122 may include embeddings associated with multiple time scales $\tau_k$. Depending on a rhythm and speed of speech 101, intervals (and, therefore, embeddings) of different time scales may be more (or less) representative of the source of the speech spoken during respective intervals. For example, in a speech episode corresponding to a professional meeting, longer time intervals may be more representative of the source of speech produced at any particular time whereas shorter time intervals may be more representative of unstructured speech produced during an informal setting. Correspondingly, trained DWM 124 may identify the weights to be assigned to different time scales for various intervals of speech. DWM 124 may process, for each time of the speech episode, the corresponding embeddings associated with different time scales together with the aggregated cluster embeddings to estimate weights to be assigned to different time scales. The estimated weights may then be used to weight similarity (e.g., cosine similarity) of speech embeddings with the aggregated cluster embeddings and process the weighted similarities by SLM 126 to identify final speaker labels for various times of the speech. Further details about processing of speech by SEM 120, CM 122, DWM 124, and SLM 126 are disclosed below in conjunction with FIGS. 3-5.

Speech 101 (which may include training speech 152 and/or evaluation speech 154) may be stored in a data repository in a raw audio format, in the form of spectrograms, or in any other suitable representation characterizing speech of a particular person. For example, a spectrogram of speech 101 may be obtained by recording air pressure caused by the speech as a function of time and computing a short-time Fourier transform for overlapping time intervals (frames) of a set duration. This maps the audio signal from the time domain to the frequency domain and generates a spectrogram characterizing the spectral content of speech 101. The amplitude of the audio signal may be represented on a logarithmic (decibel) scale. In some embodiments, the obtained spectrograms may be further converted into mel-spectrograms, by transforming frequency f into a non-linear mel domain, $f \rightarrow m = a \ln(1+f/b)$, to take into account the ability of a human ear to distinguish better equally spaced frequencies (tones) at the lower end of the frequencies of the audible spectrum than at its higher end; for example, a=1607 and b=700 Hz. Throughout this disclosure, the term "spectrogram" should be understood to include spectrograms, e.g., mel-spectrograms, where applicable.

In at least one embodiment, one or more of SEM 120, CM 122, DWM 124, and SLM 126 may be implemented as deep learning neural networks having multiple levels of linear or non-linear operations. For example, one or more of SEM 120, CM 122, DWM 124, and SLM 126 may include convolutional neural layers, recurrent neural layers, fully-connected neural networks, neural networks with memory layers/subnetworks, and/or so on. In at least one embodiment, one or more of SEM 120, CM 122, DWM 124, and SLM 126 may include multiple neurons that may receive inputs from other neurons and/or from an external source and may produce an output by applying an activation function to the sum of weighted inputs and a bias value. In at least one embodiment, one or more of SEM 120, CM 122, DWM 124, and SLM 126 may include multiple neurons arranged in layers, including an input layer, one or more hidden layers, and/or an output layer. Neurons from adjacent layers may be connected by weighted edges. In some embodiments, training server 160 may train a number of different models (only DWM 124 and SLM 126 are shown on training server 160 in FIG. 1 for brevity, but it should be understood that SEM 120 and/or CM 122 may be trained by training server 160).

Training speech 152 may be used by a training server 160 to identify parameters (e.g., neural weights, biases, parameters of activation functions, etc.) of DWM 124 and/or SLM 126 that maximize success of speaker identification, verification, and/or diarization. Training server 160 may be hosted by a desktop computer, a laptop computer, a smartphone, a tablet computer, a server, and/or any suitable computing device capable of performing the techniques described herein. In some embodiments, training of DWM 124 and/or SLM 126 may be supervised (e.g., using human-annotations of training speech 152 with speaker identities as ground truth), unsupervised, and/or semi-supervised.

Training server 160 may deploy a training engine 162 that uses training inputs 165 to train DWM 124 and/or SLM 126 (and SEM 120 and/or CM 122, if applicable) that jointly perform speaker diarization. Training engine 162 may also generate mapping data 166 (e.g., metadata) that associates training input(s) 165 with correct target output(s) 167. During training of DWM 124 and/or SLM 126 (and SEM 120 and/or CM 122), training engine 162 may identify patterns in training input(s) 165 based on desired target output(s) 167 and train DWM 124 to determine weights for weighting different times scales and train SLM 126 to identify speaker labels for different times of training speech 152. Predictive utility of the identified patterns may be subsequently verified using additional training input/target output associations. During the inference (evaluation) stage trained DWM 124 and/or SLM 126 may use the identified patterns for processing of evaluation speech 154. In at least one embodiment, training server 160 and inference server 102 may be implemented on a single computing device. Training server 160 and/or inference server 102 may be (and/or include) a rackmount server, a router computer, a personal computer, a laptop computer, a tablet computer, a desktop computer, a media center, and/or any combination thereof.

Initially, parameters (edge weights and biases) of various models may be assigned some starting (e.g., random) values. For every training input 165, training engine 162 may cause DWM 124 and/or SLM 126 (and SEM 120 and/or CM 122, if applicable) to generate training output(s). Training engine 162 may then compare observed output(s) with the desired target output(s) 167. The resulting error or mismatch, e.g., the difference between the desired target output(s) 167 and the actual output(s) of the neural networks, may be back-propagated through the respective neural networks, and the parameters (e.g., weights and biases) of the neural network(s) may be adjusted to make the actual outputs closer to the target (ground truth) outputs 167. This adjustment may be repeated until the output error for a given training input 165 satisfies a predetermined condition (e.g., falls below a predetermined value) or converges to an acceptable level of accuracy. Subsequently, a different training input 165 may be selected, a new output generated, and/or a new series of adjustments implemented, until the respective neural networks are trained to a target degree of accuracy (e.g., until the neural network(s) converge).

Figure 2:
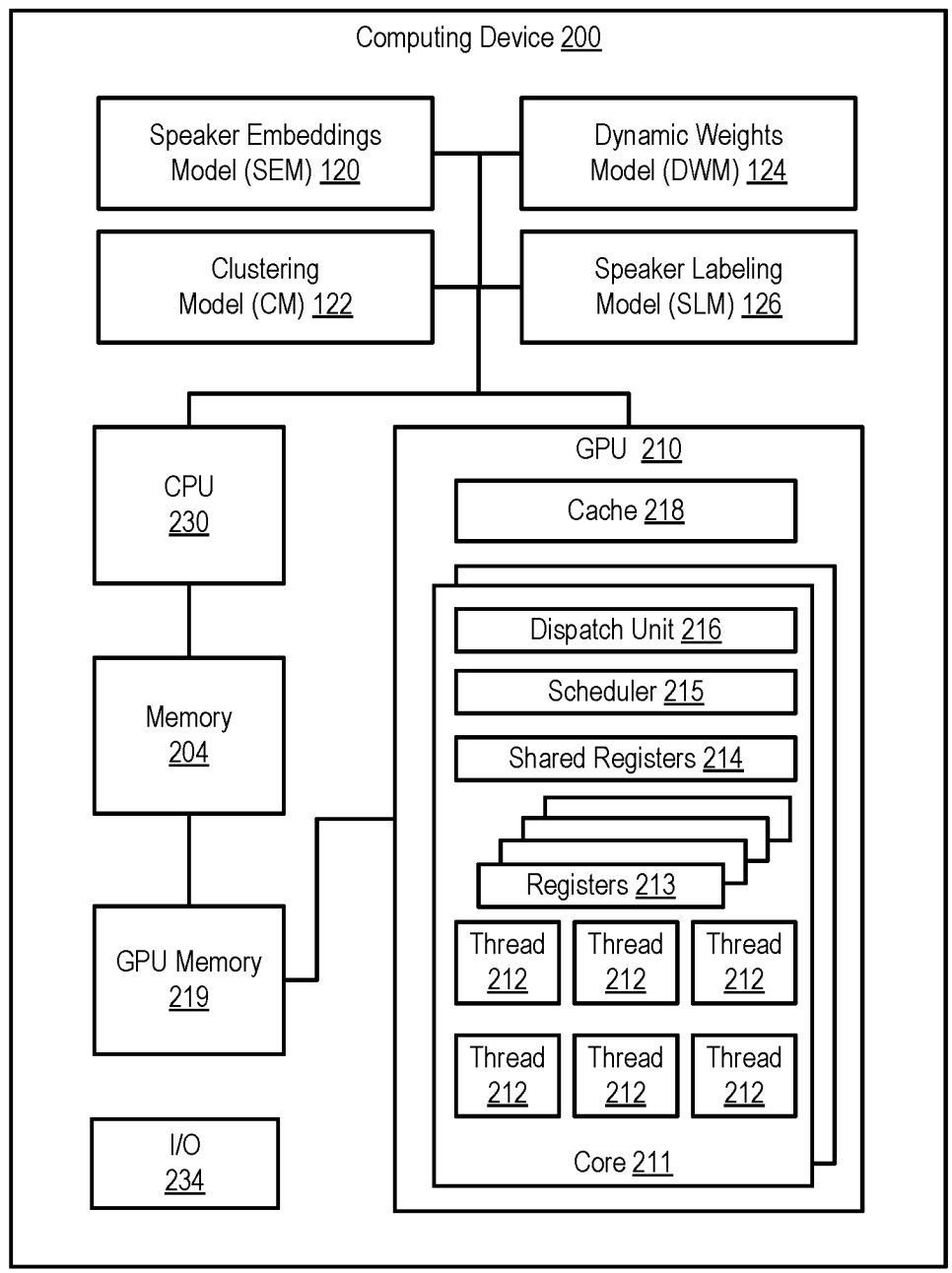
FIG. 2 illustrates an example computing device which may train or deploy multi-scale machine-learning systems with dynamically-weighted embeddings for efficient speaker diarization, according to at least one embodiment.

FIG. 2 illustrates an example computing device 200 which may train or deploy multi-scale machine-learning systems with dynamically-weighted embeddings for efficient speaker diarization, according to at least one embodiment. In at least one embodiment, computing device 200 may be a part of inference server 102. In at least one embodiment, computing device 200 may be a part of training server 160. In at least one embodiment, SEM 120, CM 122, DWM 124, and/or SLM 126 may be executed using one or more GPUs 210 (and/or other parallel processing units (PPUs) or accelerators, such as a deep learning accelerator, a data processing unit (DPU), etc.) and one or more CPUs 230. In at least one embodiment, a GPU 210 includes multiple cores 211, each core being capable of executing multiple threads 212. Each core may run multiple threads 212 concurrently (e.g., in parallel). In at least one embodiment, threads 212 may have access to registers 213. Registers 213 may be thread-specific registers with access to a register restricted to a respective thread. Additionally, shared registers 214 may be accessed by one or more (e.g., all) threads of the core. In at least one embodiment, each core 211 may include a scheduler 215 to distribute computational tasks and processes among different threads 212 of core 211. A dispatch unit 216 may implement scheduled tasks on appropriate threads using correct private registers 213 and shared registers 214. Computing device 200 may include input/output component(s) 234 to facilitate exchange of information with one or more users or developers.

In at least one embodiment, GPU 210 may have a (high-speed) cache 218, access to which may be shared by multiple cores 211. Furthermore, computing device 200 may include a GPU memory 219 where GPU 210 may store intermediate and/or final results (outputs) of various computations performed by GPU 210. After completion of a particular task, GPU 210 (or CPU 230) may move the output to (main) memory 204. In at least one embodiment, CPU 230 may execute processes that involve serial computational tasks whereas GPU 210 may execute tasks (such as multiplication of inputs of a neural node by weights and adding biases) that are amenable to parallel processing. In at least one embodiment, specific models (e.g., SEM 120, CM 122, DWM 124, SLM 126) may determine which processes are to be executed on GPU 210 and which processes are to be executed on CPU 230. In other embodiments, CPU 230 may determine which processes are to be executed on GPU 210 and which processes are to be executed on CPU 230.

Multi-Scale Diarization Systems with Dynamically-Weighted Embeddings

Figure 3:
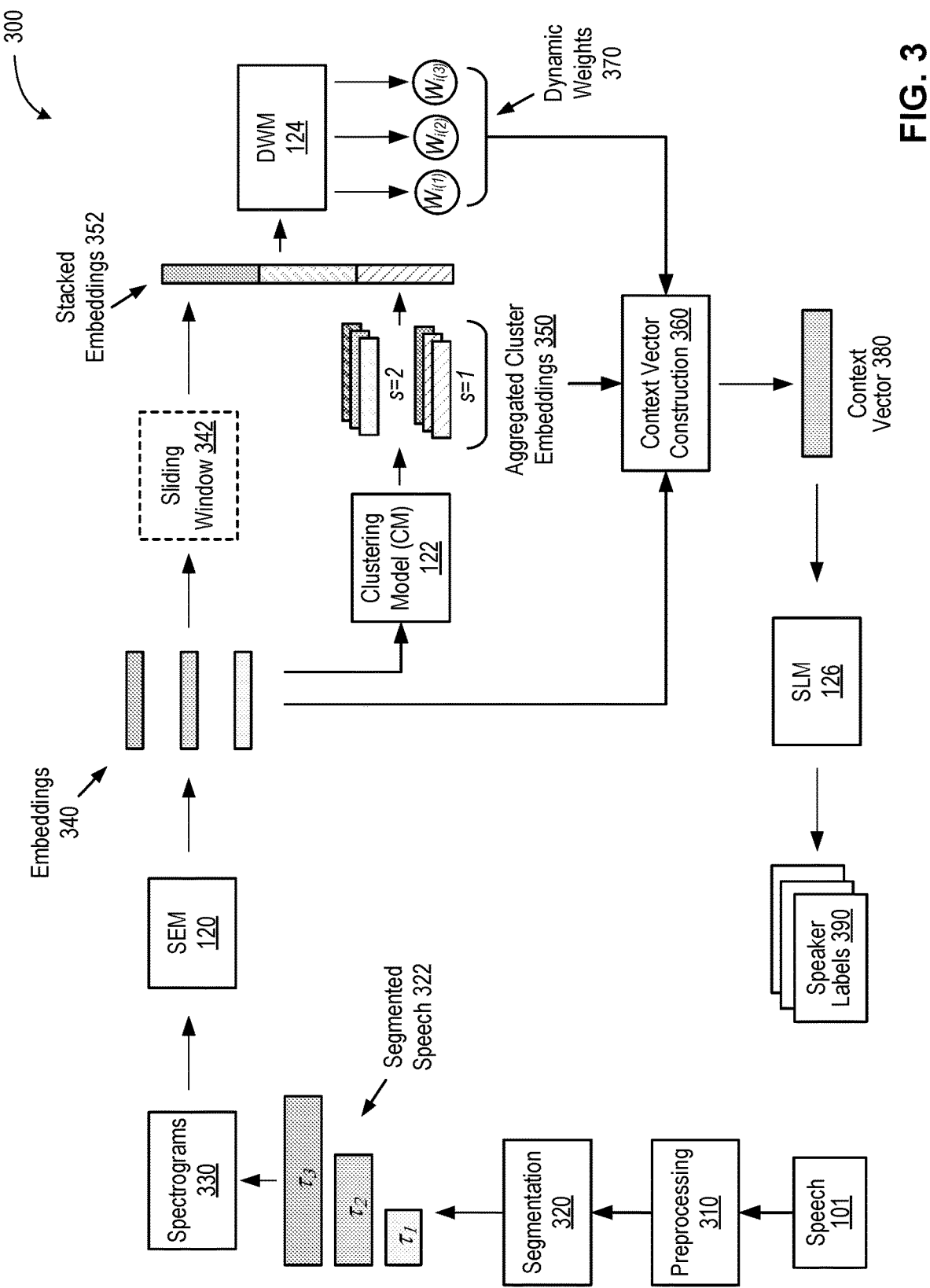
FIG. 3 illustrates schematically an example architecture of a multi-scale diarization system with dynamically-weighted embeddings, according to at least one embodiment.

FIG. 3 illustrates schematically an example architecture 300 of a multi-scale diarization system with dynamically-weighted embeddings, according to at least one embodiment. In at least one embodiment, the multi-scale diarization system of FIG. 3 may be implemented using training server 160 and/or inference server 102, which may be located on a single computing device or on two or more computing devices. Various blocks in FIG. 3 denoted with the same numerals as the respective blocks of FIG. 1 and/or FIG. 2 may implement the same (or a similar) functionality.

As illustrated in FIG. 3, speech 101 may be used as an input into the multi-scale diarization system. Speech 101 may be generated, e.g., spoken, by any number of speakers. Speech 101 may include a single speech episode or multiple speech episodes. Training speech 101 may undergo speech preprocessing 310, which may include audio filtering, denoising, amplification, and/or any other suitable enhancement. Speech preprocessing 310 may further include removal of portions of speech 101 that do not have a speech content. For example, speech preprocessing 310 may process energy e(t) of speech 101 as a function of time and identify regions of speech 101 that have energy less than a certain threshold (e.g., an empirically determined noise threshold). Such identified regions may be removed (trimmed) from speech 101 during speech preprocessing 310.

Figure 4A:
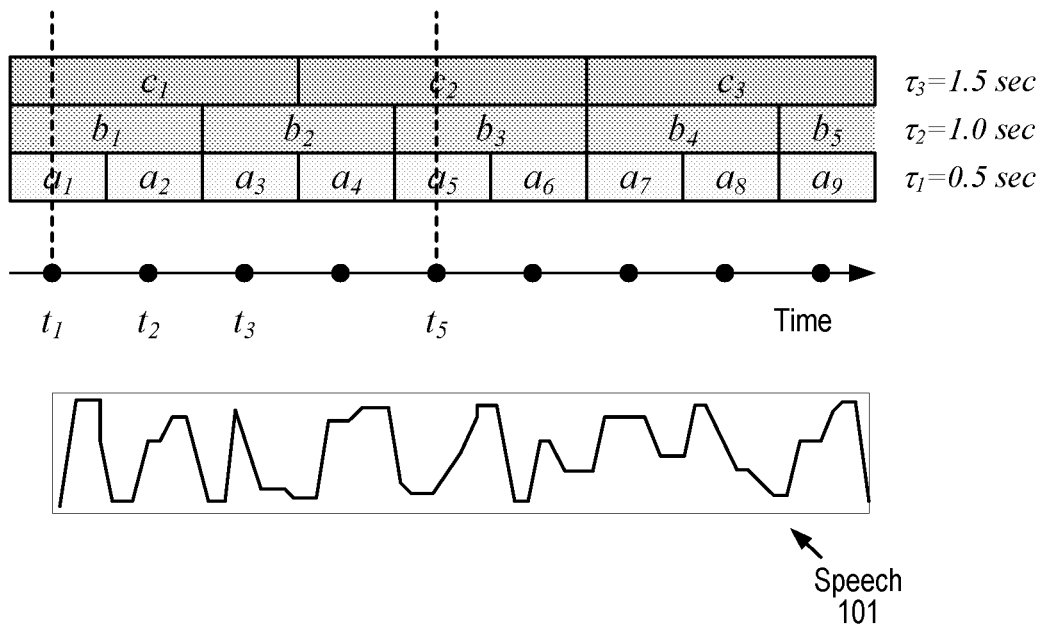
FIGS. 4A-B illustrate example segmentation schemes that may be used to partition speech into multi-scale intervals, according to at least one embodiment.
Figure 4B:
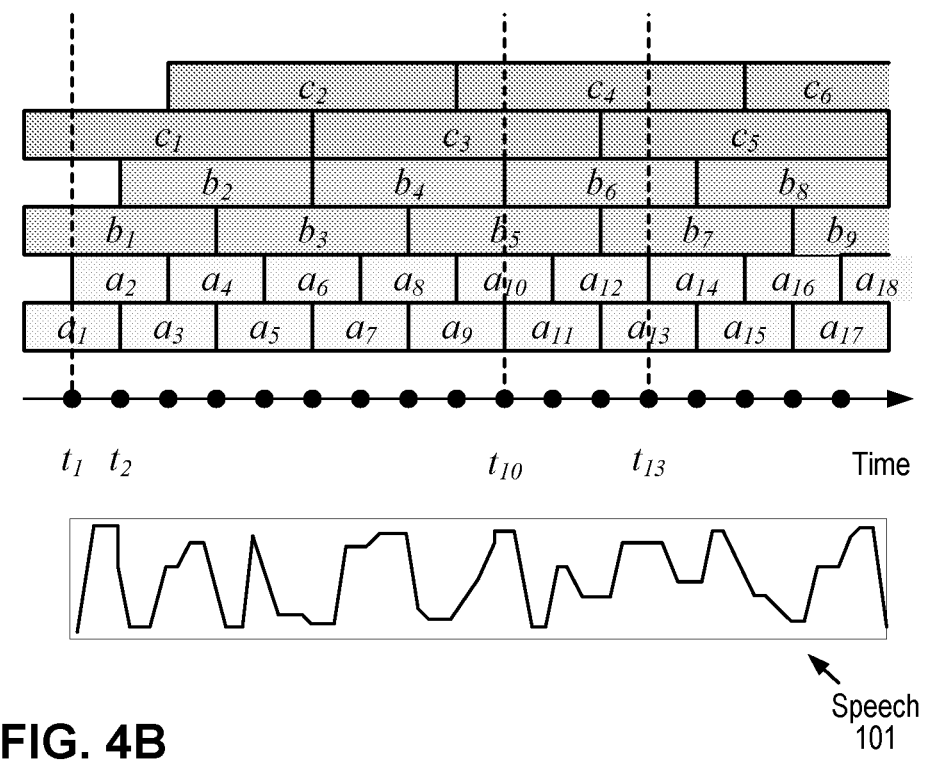

In some embodiments, speech 101 may undergo segmentation 320 into intervals of multiple sizes (scales, durations), $\tau_1, \tau_2 \ldots \tau_K$. FIGS. 4A-B illustrate example segmentation schemes that may be used to partition speech 101 into multi-scale intervals, according to at least one embodiment. For example, FIG. 4A illustrates segmentation of speech 101 into non-overlapping multi-scale intervals. More specifically, speech 101 (e.g., represented via energy e(t), air pressure p(t), or any other suitable physical quantity) may be partitioned into intervals $a_j$ of a first (base) duration $\tau_1$ (e.g., $\tau_1=0.5$ sec, or any other duration). Similarly, speech 101 may be further partitioned into intervals $b_j$ of a second duration $\tau_2$ (e.g., $\tau_2=1.0$ sec, or any other duration), intervals $c_j$ of a third duration $\tau_3$ (e.g., $\tau_3=1.5$ sec, or any other duration), and intervals of any additional duration. As a result, each discretized time $t_i$, also referred herein to as a reference time $t_i$ of the speech, is associated with K intervals of different sizes. For example, reference time $t_1$ may be associated with intervals $a_1, b_1, c_1$, reference time $t_5$ may be associated with intervals $a_5, b_3, c_2$, and so on.

As another example, FIG. 4B illustrates segmentation of speech 101 into overlapping multi-scale intervals. More specifically, intervals $a_j$ of the base duration $\tau_1$ may be overlapping such that even intervals $a_{2l}$ overlap with a portion of each of the adjacent odd interval, $a_{2l-1}$ and $a_{2l+1}$, and odd intervals $a_{2l+1}$ overlap with a portion of each adjacent even interval, $a_{2l}$ and $a_{2l+2}$ (and similarly for intervals $b_j, c_j, \ldots$ of other durations). Each reference time $t_i$ may still be associated with one interval of each size, e.g., reference time $t_1$ may be associated with intervals $a_1, b_1, c_1$, and reference time $t_{10}$ may be associated with intervals $a_{10}, b_5, c_3$. Selection of the associated intervals of any given scale $\tau_k$ may be performed based on the shortest distance to the centers of intervals of that scale $\tau_k$. More specifically, as reference time $t_{10}$ is located within two overlapping intervals $c_3$ and $c_4$, the interval $c_3$ may be associated with reference time $t_{10}$ since the distance from reference time $t_{10}$ to the center of interval $c_3$ is smaller than the distance from reference time $t_{10}$ to the center of interval $c_4$. In those instances where reference time $t_i$ is equidistant from centers of two intervals, any suitable rule may be established, e.g., the earlier interval may be selected, e.g., time $t_{13}$ may be associated with intervals $a_{13}, b_6$ (rather than with interval $b_7$), and $c_4$. It should be understood that various other schemes of assigning multi-scale intervals to reference times may be used instead. In the example of FIG. 4B, there are two overlapping intervals of the base scale (as well as other scales). Correspondingly, the spacing $t_{i+1}-t_i$ between two adjacent reference times is equal to half the base scale, $\tau_k/2$. In some embodiments, more than two overlapping intervals of the base scale may be defined (e.g., m overlapping intervals) for each reference time; correspondingly the spacing between two adjacent reference times may be less than half the base scale (e.g., $\tau_k/m$). In some embodiments, different scales may have different number of overlapping intervals, e.g., each reference time $t_i$ may be within 3 overlapping intervals of base scale $\tau_1$ and 2 overlapping intervals of scale $\tau_2$.

Referring again to FIG. 3, segmented speech 322 (partitioned into multi-scale intervals, as described herein) may undergo a suitable speech-to-spectrogram transformation. For example, spectrograms 330 of speech 101 may be obtained by performing a discrete Fourier transform of acoustic energy e(t) (or air pressure p(t)) for each interval of segmented speech 322. The obtained training spectrograms 330 $e(f_j)$ may be defined for a number of bands $f_1, f_2 \ldots f_c$, for example, for C=80 bands or C=128 bands, or any other number of bands. In some embodiments, the bands may be mel-bands and spectrograms 330 may be mel-spectrograms.

Spectrograms 330 of each interval of multiple time scales $\tau_1, \tau_2 \ldots \tau_K$ may be processed by SEM 120. Each interval may be indexed by its reference time $t_i$ and duration $\tau_k$, which defines the start $t_i-\tau_k/2$ and end time $t_i+\tau_k/2$ of the interval. Processing of spectrograms of the intervals $[t_i-\tau_k/2, t_i+\tau_k/2]$ by SEM 120 generates respective embeddings $E_{i(k)}$ 340. Embeddings $E_{i(k)}$ 340 may be any digital representations of the respective speech intervals. Embeddings $E_{i(k)}$ 340 may describe speech characteristics of a speaker, such that embeddings obtained for different utterances produced by the same speaker have similar embeddings (e.g., having cosine similarity that is closer to 1 than to 0) and speech utterances produced by different speakers have dissimilar embeddings (e.g., having cosine similarity that is closer to 0 than to 1). SEM 120 may be trained to generate embeddings of a fixed length (e.g., 192-bit embeddings, 256-bit embeddings, or embeddings of any other length).

Embeddings $E_{i(k)}$ 340 associated with different reference times $t_i$ may be processed by a CM 122. CM 122 may group embeddings $E_{i(k)}$ 340 among a plurality of clusters, e.g., based on similarity (e.g., cosine similarity) of various embeddings. A number S of different clusters (different speakers in the speech episode) may be determined in the course of clustering as the number of distinct groups of embeddings 340. At various reference times $t_i$, any number (of the total of S) speakers may be speaking together, e.g., any one speaker speaking alone or any two or more speakers co-speaking at the same time. Based on clustering of embeddings $E_{i(k)}$ 340, CM 122 may also determine preliminary speaker labels for each reference time $t_i$. For example, after clustering embeddings $E_{i(k)}$ 340 among S clusters, CM 122 may determine to which cluster the majority of embeddings $E_{i(1)}, E_{i(2)}, \ldots E_{i(K)}$ belong for various reference times $t_i$. In the instances where equal number of embeddings among $E_{i(1)}, E_{i(2)}, \ldots E_{i(K)}$ have been associated with different clusters (e.g., because of multiple co-speakers), a greater weight may be given during identification of preliminary speaker labels to embeddings associated with the base scale, $E_{i(1)}$, or to high scale, $E_{i(K)}$, or any other preferred scale k.

CM 122 may further compute aggregated cluster embedding $V_{(k)}^s$ for each cluster s and each time scale k. More specifically, CM 122 may select all $N_s$ embeddings $E_{i(k)}^s$ that have been associated with a given clusters and a given time scale k and average such embeddings to obtain an aggregated cluster embedding 350, e.g.: $V_{(k)}^s = N_s^{-1} \cdot \Sigma_{i=1}^{N_s} E_{i(k)}^s$. For simplicity, a situation of two identified clusters, s=1 and s=2, and three time scales (e.g., K=3) is illustrated in FIG. 3 (with different shadings indicating schematically aggregated cluster embeddings 350 corresponding to different time scales), but the disclosed operations may be performed similarly for any other number S of clusters and any number K of time scales.

Aggregated cluster embeddings 350 represent global digital fingerprints of S likely speakers in the speech episode. Aggregated cluster embeddings 350 describe averaged, over some portion of (e.g., the whole) episode, characteristics of speech of various speakers. Aggregated cluster embeddings 350 (representing global speech episode context) may be combined with embeddings $E_{i(k)}$ 340 (representing local speech context) for context vector construction 360. For example, context vector construction 360 may compute a similarity of the embeddings $E_{i(k)}$ to the aggregated cluster embeddings $V_{(k)}^s$, e.g., using the cosine similarity function, $\cos(E_{i(k)}, V_{(k)}^s) = E_{i(k)} \cdot V_{(k)}^s / (\|E_{i(k)}\| \|V_{(k)}^s\|)$. The computed similarities characterize the likelihood that a given speakers is speaking at reference time $t_i$, as indicated by the corresponding interval of time scale k. Different scales k may additionally be weighted with different learned dynamic weights. Learned weights may be computed by DWM 124 using embeddings 340 and aggregated cluster embeddings 350. In some embodiments, weights $W_{i(k)}$ may be computed dynamically, e.g., separately for different reference times $t_i$. In some embodiments, input into DWM 124 may include respective embeddings $E_{i(1)} \ldots E_{i(K)}$ stacked (e.g., concatenated) together with the set of the aggregated cluster embeddings $\{V_{(k)}^s\} = V_{(1)}^1 \ldots V_{(K)}^1, V_{(1)}^2 \ldots V_{(K)}^2, \ldots, V_{(1)}^S \ldots V_{(K)}^S$, which includes aggregated cluster embeddings 350 for various clusters s=1 \ldots S and various time scales k=1 \ldots K). Sliding window 342 selects consecutive reference times $t_i$ and constructs stacked embeddings $D_i = (E_{i(1)} \ldots E_{i(K)}, \{V_{(k)}^s\})$. The stacked embeddings $D_i$ 352 may be processed by the DWM 124 to generate dynamic weights $W_{i(k)}$ 370.

Figure 5A:
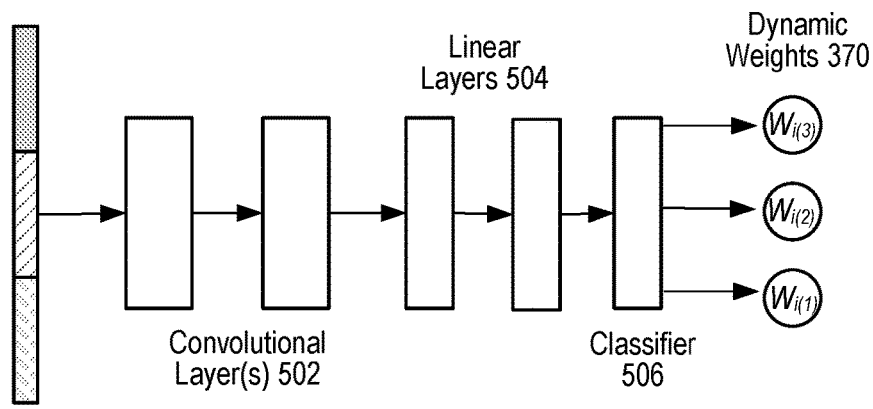
FIG. 5A illustrates one example neural network architecture of a dynamic weights model, according to at least one embodiment.

FIG. 5A illustrates one example neural network architecture of DWM 124, according to at least one embodiment. As illustrated in FIG. 5A, DWM 124 may include one or more convolutional layers 502, which may use one-dimensional (1D) filters to compare different stacked embeddings $D_i$ 352, e.g., component-by-component. For example, in a four-scale embodiment (K=4) with each embedding $E_{i(k)}$ and aggregated cluster embedding $V_{(k)}^s$ having 192 components, and two identified clusters (S=2), the stacked embeddings $D_i$ 352 may include 12 embeddings (e.g., four embeddings $E_{i(k)}$ for various times scales and four aggregated cluster embeddings $V_{(k)}^s$ for various times scales and per each of the two clusters) so that 1D filters of convolutional layers 502 applied to the stacked embeddings $D_i$ 352 may evaluate component-by-component differences of these 12 embeddings. DWM 124 may further include one or more linear layers 504 and a classifier 506, which may be a softmax layer. Classifier 506 may output S (for each reference time $t_i$) dynamic weights $W_{i(k)}$ 370.

Figure 5B:
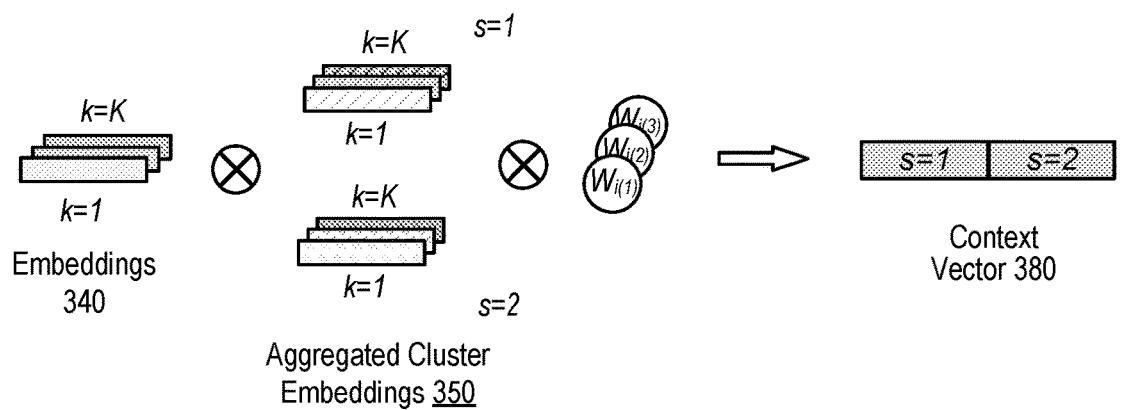
FIG. 5B illustrates one example construction of a context vector, according to at least one embodiment.

With a continuing reference to FIG. 3, computed dynamic weights $W_{i(k)}$ 370 may be used in context vector construction 360. FIG. 5B illustrates one example construction of a context vector 380, according to at least one embodiment. More specifically, a context sub-vector $C_i^s[k]$ may be formed for each speaker s (a situation of two speakers is illustrated in FIG. 5B for conciseness) and each reference times $t_i$ (with different components of the context sub-vector $C_i^s[k]$ corresponding to various time scales k). For example, context vector $C_i^s[k]$ may represent a cosine similarity of the embeddings $E_{i(k)}$ and the aggregated cluster embeddings $V_{(k)}^s$, $C_i^s[k] = w_{i(k)} \cos(E_{i(k)}, V_{(k)}^s)$ weighted with the respective dynamic weights $W_{i(k)}$. Various context sub-vectors $C_i^s[k]$ corresponding to different speakers s may then be combined, e.g., concatenated into context vector 380, e.g., ($C_i^1[k]$, $C_i^2[k]$, ... $C_i^S[k]$).

Figure 5C:
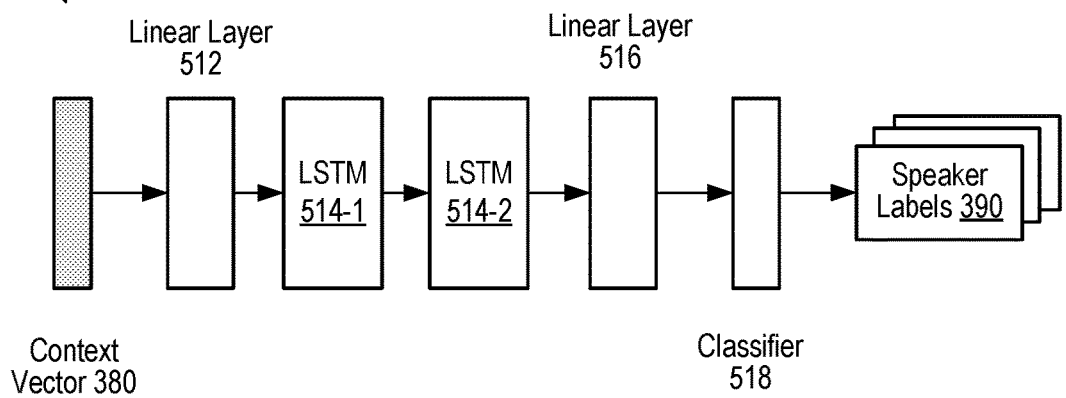
FIG. 5C illustrates one example neural network architecture of a speaker labeling model, according to at least one embodiment.

Referring again to FIG. 3, the constructed context vector 380 may be processed by SLM 126 that generates probabilities (or generalized likelihoods) $P_i^s$ that speaker s is speaking at reference time $t_i$. FIG. 5C illustrates one example neural network architecture of SLM 126, according to at least one embodiment. As illustrated in FIG. 5C, SLM 126 may include one or more linear layers 512, followed by one or more Long Short-Term Memory (LSTM) 514-n subnetworks (a Bi-LSTM configuration of SLM 126 is shown, with two LSTM 514-1 and LSTM 514-2 layers). LSTM(s) 514-n may be followed with one or more linear layers 516 and a classifier 518 that outputs speaker labels 390. In some embodiments, classifier 518 may include multiple (e.g., two, three, four) sigmoid classifiers, each sigmoid classifier generating a probability (likelihood) that one of S speakers is speaking at reference time $t_i$. Each sigmoid classifier may output probabilities within the [0,1] interval with probability close to 0 indicating a low likelihood that the corresponding speaker is speaking at reference time $t_i$ and probability close to 1 indicating a high likelihood that the corresponding speaker is speaking at reference time $t_i$.

Since the number of speakers S in a speech episode may be arbitrary, to implement efficient speaker diarization using a fixed SLM architecture, the number of sigmoid classifiers may be two (three, or some other fixed number) with multiple speaker detection performed using pairwise probabilities. More specifically, SLM 126 may operate on pairs of speakers (s, q) by processing context vectors corresponding to the respective pair of speakers, ($C_i^s[k]$, $C_i^q[k]$). Correspondingly, to process the speech episode, SLM 126 may be applied for a total of S(S−1)/2 rounds, once for each different pairs of S speakers. In some embodiments, processing of different pairs of speakers may be performed in parallel. Each round of SLM processing may generate simulated pairwise probabilities $p_{i(s,q)}^s$ of a speaker s speaking at reference time $t_i$, as estimated from processing of the (s, q)-pair by SLM 126. Simulated pairwise probabilities $p_{i(s,q)}^s$ may be output by two sigmoid classifiers of SLM 126 corresponding to the respective speakers s and q. The probabilities $P_i^s$ may then be computed by averaging all S−1 various pairwise probabilities $p_{i(s,q)}^s$ associated with speaker s, e.g., $P_i^s = (S-1)^{-1} \cdot \Sigma_{q \neq s} p_{i(s,q)}^s$. In some embodiments, an empirical threshold value T may be used as a cut-off for probabilities $P_i^s$. A situation where $P_i^s < T$ for all speakers s indicates that the likelihood of two speakers co-speaking at reference times $t_i$ is low. In such instances, the output of the initial segmentation by CM 122 may be used instead of simulated probabilities Pf.

Training of SLM 126 may be performed using ground truth labels indicating whether a given speakers is speaking at a plurality of reference times $t_i$ using any suitable loss function. In some embodiments, the cross-entropy loss function may be used, such that when speakers is speaking at reference time $t_i$, the loss function is $CE_i^s = -\log P_i^s$ and has a minimum when $P_i^s = 1$. Conversely, when speakers is not speaking at reference time $t_i$, the loss function is $CE_i^s = -\log(1 - P_i^s)$ and has the minimum when $P_i^s = 0$. In some embodiments, other loss functions may be used, such as a mean squared error loss function, root mean squared error loss function, mean absolute error loss function, mean squared logarithmic error loss function, Huber loss function, and so on.

Some of the models described in conjunction with FIG. 3, FIG. 5A, and FIG. 5B may be trained separately or together with other models. For example, SEM 120 may be trained separately and may be any machine-learning model (e.g., neural network model) capable of generating speaker embeddings that have a strong similarity (e.g., cosine similarity above a first threshold) for utterances spoken by the same person and weak similarity (e.g., cosine similarity below the first threshold or below a second, which is lower than the first, threshold). Similarly, CM 122 may be trained separately and may be any model capable of grouping similar embedding into the same clusters and dissimilar embeddings into different clusters. In some embodiments, CM 122 may be a machine-learning model. In some embodiments, CM 122 is implemented in systems that deploy clustering algorithms that do not use machine-learning techniques. CM 122 may use any suitable techniques of k-means clustering, hierarchical clustering, distribution-based clustering, density-based clustering, grid-based clustering, and the like. In some embodiments, DWM 124 and SLM 126 may be trained together, with a loss function applied to speaker labels 390 and the differences between ground truth speaker labels and speaker labels predicted by SLM backpropagated through neurons of both SLM 126 and DWM 124 to reduce the differences, e.g., using the gradient descent method or various similar techniques. Initially, at the start of training, dynamic weights {$W_{i(k)}$} may be set to random values. In some embodiments, dynamic weights {$W_{i(k)}$} may be initially determined using a linear progression from a starting value for the base scale, e.g., $W_{i(1)} = 1$, to some other value r (which may be smaller or greater than 1) for the last scale, $W_{i(K)} = r$, e.g., $$W_{i(k)} = \frac{K-r}{K-1} + k\frac{r-1}{K-1}.$$

or any other (e.g., non-linear) interpolation.

In some embodiments, multiple sets of DWM 124 and SLM 126 may be trained separately for different speech environments, e.g., a meeting environment, a public event environment, a phone conversation environment, and so on.

Figure 6:
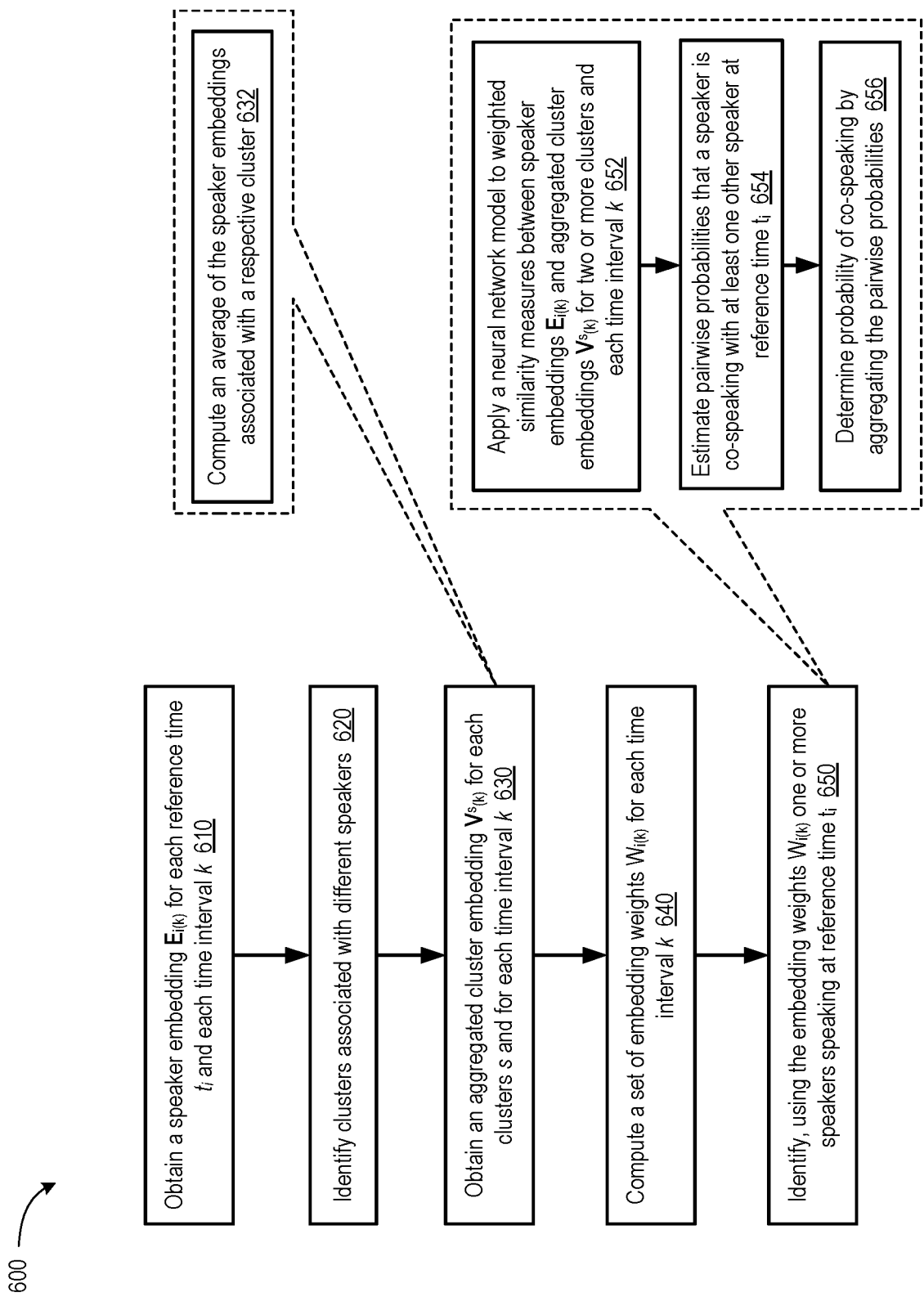
FIG. 6 is a flow diagram of an example method of performing multi-scale diarization using dynamically-weighted embeddings, according to at least one embodiment.

FIG. 6 is a flow diagram of an example method of performing multi-scale diarization using dynamically-weighted embeddings, according to at least one embodiment. Method 600 may be performed using one or more processing units (e.g., CPUs, GPUs, accelerators, PPUs, DPUs, etc.), which may include (or communicate with) one or more memory devices. In at least one embodiment, method 600 may be performed using processing units of inference server 102 and/or training server 160. In at least one embodiment, processing units performing method 600 may be executing instructions stored on a non-transient computer-readable storage media. In at least one embodiment, method 600 may be performed using multiple processing threads (e.g., CPU threads and/or GPU threads), individual threads executing one or more individual functions, routines, subroutines, or operations of the method. In at least one embodiment, processing threads implementing method 600 may be synchronized (e.g., using semaphores, critical sections, and/or other thread synchronization mechanisms). Alternatively, processing threads implementing method 600 may be executed asynchronously with respect to each other. Various operations of method 600 may be performed in a different order compared with the order shown in FIG. 6. Some operations of method 600 may be performed concurrently with other operations. In at least one embodiment, one or more operations shown in FIG. 6 may not always be performed.

Method 600 may involve speech utterances produced by people in any possible context, e.g., a conversation, a public speech, a public event, a business meeting, a conference, a street encounter, an interaction in a game, an interaction with a chat bot or digital avatar, an interaction with an in-vehicle infotainment system, and/or the like. "Speech," as used in the context of method 600 should be understood as including sounds of non-human origins, e.g., sounds of animals. "Speech," as used in the context of method 600 should also be understood as including sounds produced by non-living entities, including natural forces, such as wind, sea, ocean, thunderstorms, and various other atmospheric or naval phenomena, as well as robots, synthesized or computer generated speech, and the like. "Speech," as used in the context of method 600 should further be understood as including artificial sounds, such as sounds of vehicles, industrial equipment, and so on. Similarly, a "speaker" should be understood as any entity (real or virtual) that generates speech.

At block 610, processing units executing method 600 may obtain, using a speech data (e.g., spectrograms 330 in FIG. 1) representative of a speech (e.g., speech 101 in FIG. 3), a speaker embedding (e.g., embeddings $E_{i(k)}$ 340 in FIG. 3) for each time (e.g., $t_i$) of a plurality of reference times of the speech and for each time interval (e.g., r) of a plurality of differently-sized (unequal) time intervals (e.g., time intervals $\tau_1, \tau_2, \tau_3 \ldots$, in FIG. 3). In some embodiments, the spacing between adjacent reference times of the plurality of reference times may be less than the smallest time interval of the plurality of differently-sized time intervals. For example, as illustrated in FIG. 4B, the spacing between adjacent reference times (depicted with black dots) is one half of the smallest time interval (e.g., time intervals $a_1$, $a_2$, $a_3$, etc.).

At block 620, processing units executing method 600 may identify, using the obtained speaker embeddings, a plurality of clusters. Each cluster may be associated with a different speaker of the speech. In some embodiments, the plurality of speakers may be identified using a neural network model (e.g., CM 122). In some embodiments, identifying the plurality of clusters may be based on cosine similarity of at least a portion of the obtained speaker embeddings.

At block 630, processing units executing method 600 may obtain an aggregated cluster embedding (e.g., aggregated cluster embeddings $V^s_{(k)}$ 350) for each of the plurality of identified clusters s and for each of the plurality of differently-sized time intervals (e.g., $\tau_k$). As indicated with the top callout block 632, obtaining the aggregated cluster embeddings may include computing an average of the speaker embeddings associated with a respective cluster of the plurality of identified clusters.

Blocks 640 and 650 may be performed for each reference time (e.g., $t_i$) of the plurality of reference times. More specifically, at block 640, processing units executing method 600 may compute, using the aggregated cluster embeddings $V_s^{(k)}$ and the speaker embeddings $E_{i(k)}$, a set of embedding weights (e.g., dynamic weights $W_{i(k)}$ 370 in FIG. 3) for each time interval of the plurality of differently-sized time intervals. In some embodiments, computing the set of embedding weights (e.g., $W_{i(k)}$) for the respective reference time (e.g., $t_i$) may include applying a neural network model (e.g., DWM 124 in FIG. 3) to an input that includes the speaker embeddings (e.g., $E_{i(k)}$) for the respective reference time (e.g., $t_i$) and for each of the plurality of differently-sized time intervals (e.g., $\tau_k$). In some embodiment, the input into the neural network model may include the aggregated cluster embeddings (e.g., $V^s_{(k)}$) for at least some of the plurality of identified clusters and for each of the plurality of differently-sized time intervals (e.g., $\tau_k$). In some embodiments, the neural network model (e.g., DWM 124, as illustrated in FIG. 5A) may include one more convolutional layers of neurons. In some embodiments, the set of embedding weights (e.g., $W_{i(k)}$) is output using a softmax classifier layer of the neural network model.

At block 650, processing units executing method 600 may identify, using the computed set of the embedding weights (e.g., $W_{i(k)}$), that one or more speakers are speaking at a respective reference time (e.g., $t_i$) of the plurality of reference times. In some embodiments, to identify speakers speaking at the respective reference times, the processing units may use a neural network model with one or more memory subnetworks (e.g., SLM 126 illustrated in FIG. 5C). In some embodiments, identifying speakers may include one or more operations illustrated with the bottom callout portion of FIG. 6.

At block 652, method 600 may include applying the neural network model (e.g., SLM 126) to an input that includes weighted, using the computed set of the embedding weights (e.g., $W_{i(k)}$), similarity measures between (i) the speaker embeddings (e.g., $E_{i(k)}$) for the respective reference time (e.g., $t_i$) and (ii) the aggregated cluster embeddings (e.g., $V^s_{(k)}$) for two or more clusters of the plurality of identified clusters and for each time interval of the plurality of differently-sized time intervals. In some embodiments, the similarity measures may be computed using a cosine similarity function.

At block 654, method 600 may continue with estimating a plurality of pairwise probabilities (e.g., pairwise probabilities $p_{i(s,q)}^s$ described in conjunction with FIG. 3). Each pairwise probability of the plurality of pairwise probabilities may characterize a likelihood that the specific speaker (e.g., speaker associated with clusters) is co-speaking with at least one other speaker (e.g., speaker associated with cluster q) of the one or more speakers at the respective reference time.

At block 656, method 600 may continue with determining an aggregated probability of co-speaking (e.g., probabilities $P_i^s$ described in conjunction with FIG. 3) by aggregating the plurality of pairwise probabilities. In some embodiments, identifying that the specific speaker (e.g., speaker associated with clusters) is speaking at the respective reference time (e.g., $t_i$) may be based on the aggregated probability (e.g., probabilities $P_i^s$) of co-speaking and a threshold probability (e.g., an empirical threshold value T).

The systems and methods described herein may be used for a variety of purposes, by way of example and without limitation, for performing one or more operations with respect to machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Inference and Training Logic

Figure 7A:
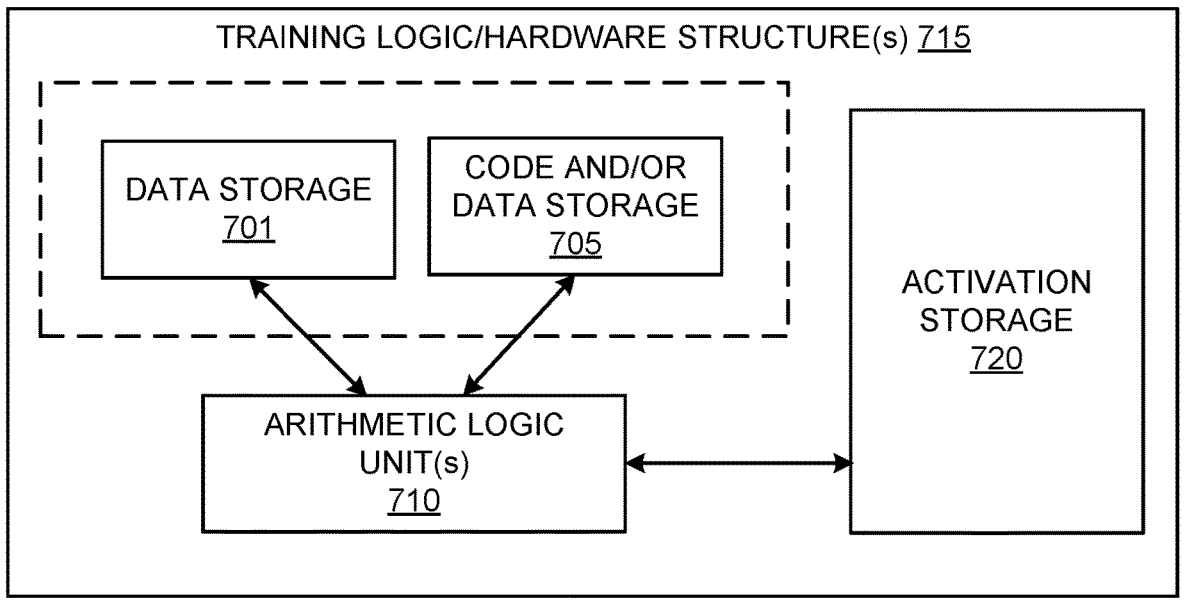
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include (or be coupled to code and/or data storage 701 that stores) graph code or other software to control timing and/or order, in which weight and/or other parameter information is to be loaded to configure processing units, including logic units, integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include (or be coupled to code and/or data storage 705 that stores) graph code or other software to control timing and/or order, in which weight and/or other parameter information is to be loaded to configure processing units, including logic units, integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s)

710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within the same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
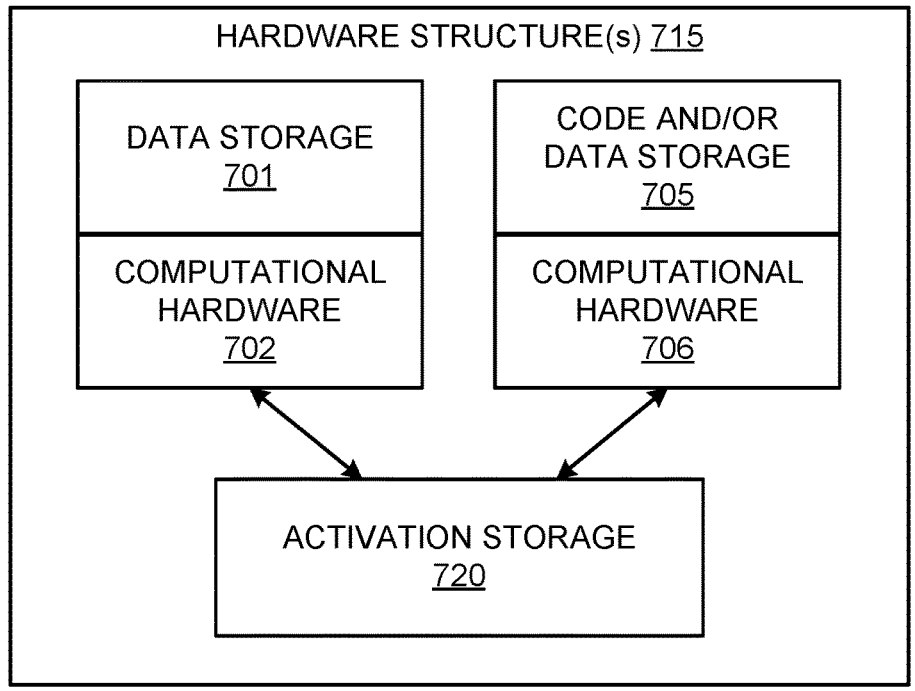
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, the result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
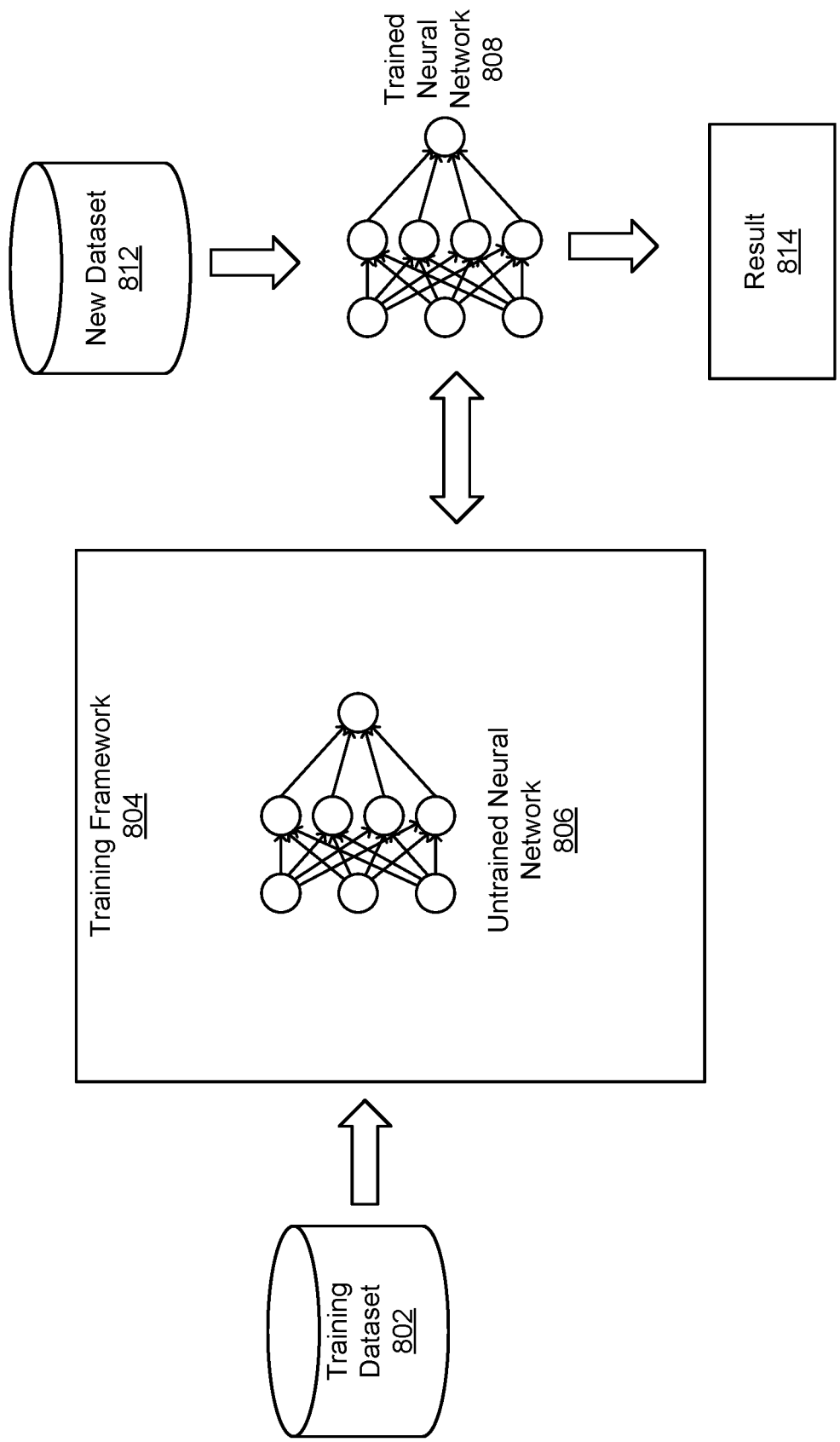
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
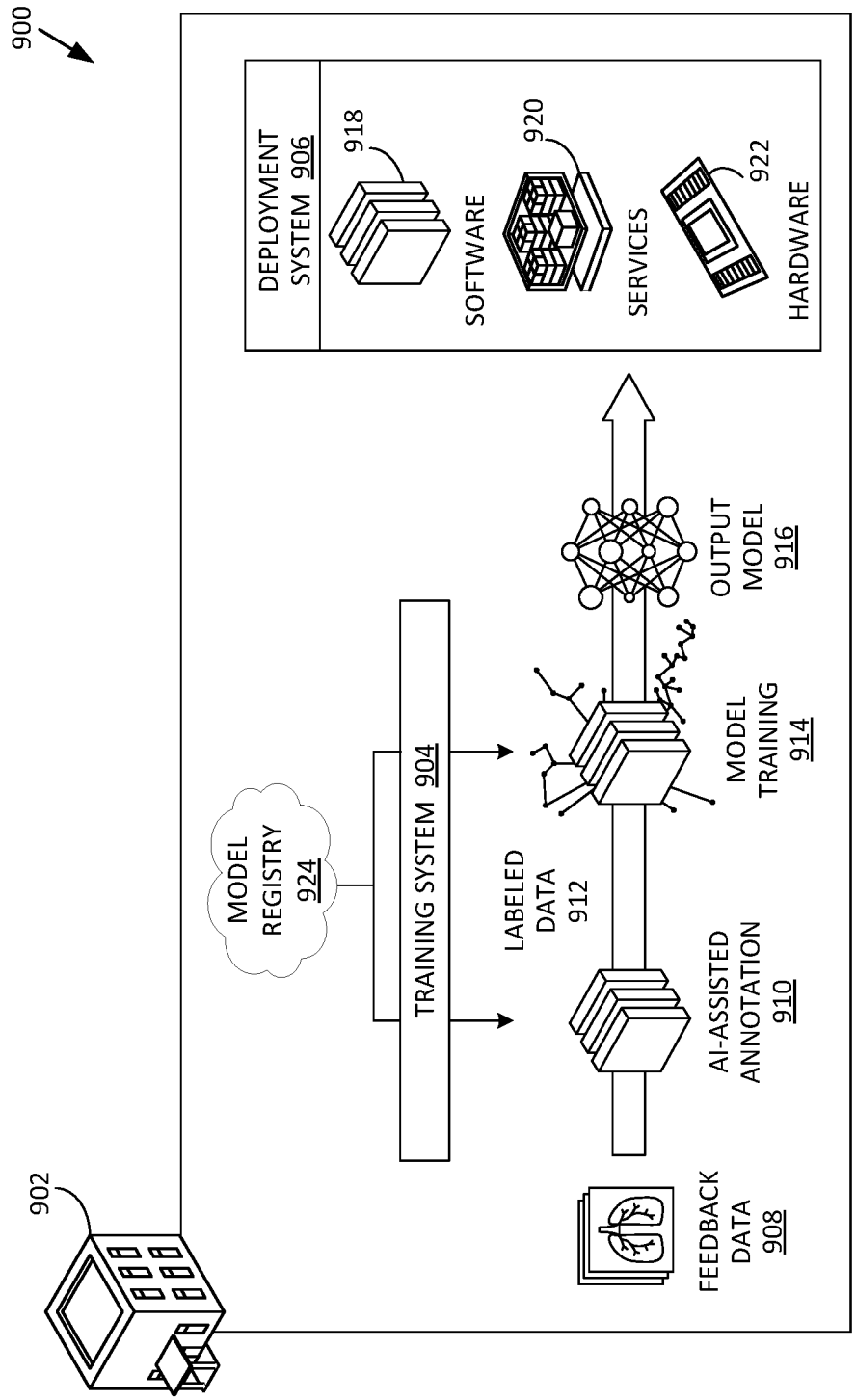
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914 may include data—e.g., AI-assisted annotations 910, labeled data 912, or a combination thereof—that may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
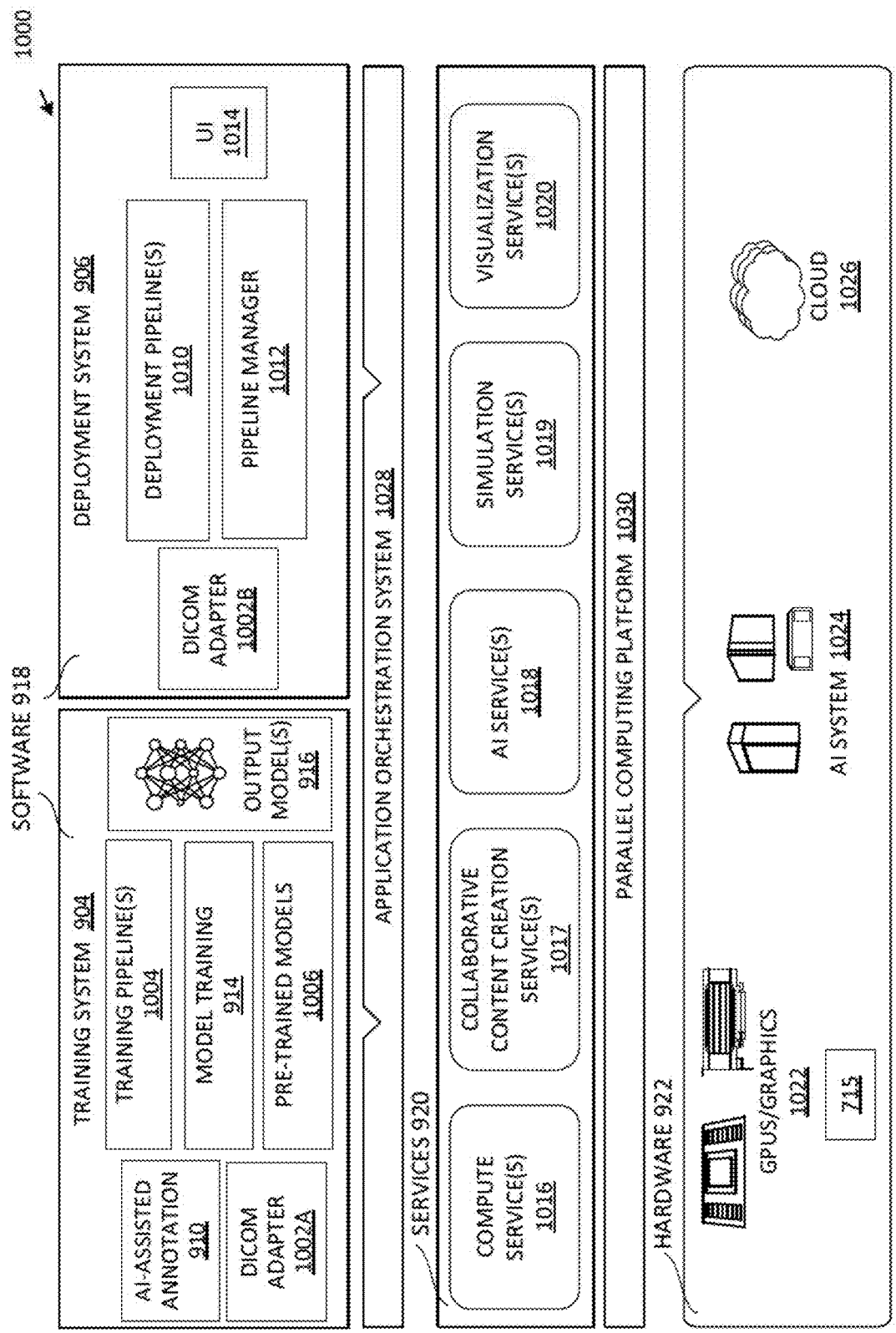
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (e.g., Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904 and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and interact with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of the applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure an appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel-level segmentation, voxel-level segmentation, generating a visualization, or generating text to summarize findings. In at least one embodiment, different models or applications may be assigned different priorities. For example, some models may have a real-time (turn-around time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA® and/or QUADRO® GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, in some embodiments, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    obtaining, using speech data representative of speech, a plurality of speaker embeddings corresponding to a plurality of reference times along a temporal scale of the speech and a plurality of time intervals, including at least two time intervals of unequal length, wherein each reference time of the plurality of reference times is associated with a plurality of segments of the speech, each segment of the plurality of segments having a duration of a respective time interval of the plurality of time intervals;
    identifying, using the plurality of speaker embeddings, a plurality of clusters individually associated with a respective speaker of the speech;
    applying a first neural network to the plurality of speaker embeddings to compute a plurality of sets of dynamic embedding weights, each set of dynamic embedding weights computed for a corresponding reference time of the plurality of reference times and comprising a plurality of dynamic weights associated with the corresponding reference time and with the plurality of time intervals; and
    identifying, using the plurality of sets of dynamic embedding weights and the plurality of clusters, one or more speakers that are speaking at a respective reference time of the plurality of reference times.

2. The method of claim 1, wherein a spacing between adjacent reference times of the plurality of reference times is less than a smallest time interval of the plurality of time intervals.

3. The method of claim 1, wherein the identifying the plurality of clusters is based at least on a cosine similarity of at least a portion of the plurality of speaker embeddings.

4. The method of claim 1, further comprising:
obtaining an aggregated cluster embedding corresponding to at least one cluster of the plurality of clusters and to a least one time interval of the plurality of time intervals,
wherein the computing the plurality of sets of dynamic embedding weights further comprises using the aggregated cluster embedding.

5. The method of claim 4, wherein the obtaining the aggregated cluster embedding comprises:
computing an average of the plurality of speaker embeddings associated with the at least one cluster of the plurality of clusters.

6. The method of claim 4, wherein the identifying the one or more speakers comprises applying a second neural network to an input comprising weighted similarity measures between (i) the plurality of speaker embeddings for the respective reference time, and (ii) the aggregated cluster embedding for individual time intervals of the plurality of time intervals, the weighted similarity measures being determined using at least one set of the plurality of sets of dynamic embedding weights.

7. The method of claim 6, wherein the weighted similarity measures are computed using a cosine similarity function.

8. The method of claim 4, wherein the first neural network is further applied to
the aggregated cluster embedding.

9. The method of claim 8, wherein the first neural network comprises one or more convolutional layers of neurons.

10. The method of claim 8, wherein the plurality of sets of dynamic embedding weights are output using a softmax classifier layer of the first neural network.

11. The method of claim 1, wherein the identifying the one or more speakers comprises using a second neural network with one or more memory subnetworks.

12. The method of claim 1, wherein the identifying the one or more speakers includes identifying that a specific speaker of the one or more speakers is speaking during the respective reference time comprises estimating a plurality of pairwise probabilities, wherein each pairwise probability of the plurality of pairwise probabilities characterizes a likelihood that the specific speaker is co-speaking with at least one other speaker of the one or more speakers at the respective reference time.

13. The method of claim 12, wherein the identifying that the specific speaker is speaking at the respective reference time further comprises determining an aggregated probability of co-speaking computed by aggregating the plurality of pairwise probabilities.

14. The method of claim 13, wherein the identifying that the specific speaker is speaking at the respective reference time is based on the aggregated probability of co-speaking and a threshold probability of co-speaking.

15. A system comprising:
one or more processing units to:
obtain, using speech data representative of speech, speaker embeddings corresponding to a plurality of reference times along a temporal scale and a plurality of unequal time intervals, wherein each reference time of the plurality of reference times is associated with a plurality of segments of the speech, each segment of the plurality of segments having a duration of a respective time interval of the plurality of unequal time intervals;
identify, using the speaker embeddings, a plurality of clusters individually associated with a different speaker; and
apply a first neural network to the speaker embeddings to compute a plurality of sets of dynamic embedding weights, each set of dynamic embedding weights computed for a corresponding reference time of the plurality of reference times and comprising a plurality of dynamic weights associated with the corresponding reference time and with the plurality of unequal time intervals; and
identify, using the plurality of sets of dynamic embedding weights and the plurality of clusters, one or more speakers speaking at respective reference times of the plurality of reference times.

16. The system of claim 15, wherein the one or more processing units are further to:
obtain aggregated cluster embeddings for individual clusters of the plurality of clusters,
wherein the computing the plurality of sets of dynamic embedding weights further comprises using the aggregated cluster embeddings.

17. The system of claim 16, wherein the one or more processing units are further to apply the first neural network to
at least a subset of the aggregated cluster embeddings corresponding to at least some of the plurality of clusters.

18. The system of claim 17, wherein to identify the one or more speakers, the one or more processing units are to apply a second neural network to an input comprising weighted similarity measures between (i) the subset of the speaker embeddings for the respective reference time and (ii) the aggregated cluster embeddings corresponding to two or more clusters of the plurality of clusters.

19. The system of claim 15, wherein the system is comprised in at least one of:
an in-vehicle infotainment system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system for generating or presenting at least one of virtual reality content, mixed reality content, or augmented reality content;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

20. A non-transitory computer-readable storage medium storing instructions that, when executed by a processing device, cause the processing device to perform operations comprising:
obtaining, using speech data representative of speech, a plurality of speaker embeddings corresponding to a plurality of reference times along a temporal scale of the speech and a plurality of time intervals, including at least two time intervals of unequal length, wherein each reference time of the plurality of reference times is associated with a plurality of segments of the speech, each segment of the plurality of segments having a duration of a respective time interval of the plurality of time intervals;

identifying, using the plurality of speaker embeddings, a plurality of clusters individually associated with a respective speaker of the speech;

applying a first neural network to the plurality of speaker embeddings to compute a plurality of sets of dynamic embedding weights, each set of dynamic embedding weights computed for a corresponding reference time of the plurality of reference times and comprising a plurality of dynamic weights associated with the corresponding reference time and with the plurality of time intervals; and identifying, using the plurality of sets of dynamic embedding weights and the plurality of clusters, one or more speakers that are speaking at a respective reference time of the plurality of reference times.

* * * * *